United States Patent [19]

Dambrackas et al.

[11] Patent Number: 4,494,232

[45] Date of Patent: Jan. 15, 1985

[54] STATISTICAL MULTIPLEXER WITH DYNAMIC BANDWIDTH ALLOCATION FOR ASYNCHRONOUS AND SYNCHRONOUS CHANNELS

[75] Inventors: William A. Dambrackas, Miami; Michael B. Marshall, Ft. Lauderdale; Larry S. Greenstein, Miami; Alex Downie, Cooper City, all of Fla.

[73] Assignee: Racal-Milgo, Inc., Miami, Fla.

[21] Appl. No.: 327,495

[22] Filed: Dec. 4, 1981

[51] Int. Cl.³ .............................................. H04J 6/02
[52] U.S. Cl. ........................................ 370/80; 370/118
[58] Field of Search ........................ 370/79, 80, 83, 95, 370/94, 82, 118

[56] References Cited

U.S. PATENT DOCUMENTS 4,093,823  6/1978  Chu ........................................ 370/80

OTHER PUBLICATIONS

J. de Smet et al., "Pacuit" Switching Combines Two Techniques in One Network, Computer Design, Jun. 1976, vol. 15, No. 6, pp. 83–88.

Primary Examiner—Douglas W. Olms
Assistant Examiner—Wellington Chin
Attorney, Agent, or Firm—Jackson, Jones & Price

[57] ABSTRACT

A statistical multiplexer is disclosed that includes interfaces for asynchronous and synchronous data equipment, and a CPU/control logic. The CPU/control logic cooperates with the interface for the synchronous data equipment for allocating bandwidth to synchronous data equipment when bandwidth is requested and for deallocating bandwidth when bandwidth is no longer required. The allocation and deallocation of bandwidth is controlled by predetermined control frames generated by the CPU/control logic. Such control frames are responded to by the synchronous data equipment interface of the multiplexer originating the control frame and the synchronous data equipment interface of the multiplexer receiving control frames.

12 Claims, 9 Drawing Figures

STATISTICAL MULTIPLEXER WITH DYNAMIC BANDWIDTH ALLOCATION FOR ASYNCHRONOUS AND SYNCHRONOUS CHANNELS

BACKGROUND OF THE INVENTION

The disclosed invention relates generally to statistical multiplexers, and particularly is directed to a statistical multiplexer system which allocates bandwidth for asynchronous and synchronous channels on a dynamic basis. That is, bandwidth is allocated to a channel if needed, and if not needed bandwidth is de-allocated.

The prior art includes multiplexers which can be generally grouped into two types.

The first type can be referred to as the conventional type of time division multiplexer (TDM) wherein the composite data link is divided into fixed time slots and each time slot is assigned to a predetermined channel. Each channel has bandwidth regardless of whether such channel needs the assigned bandwidth at all times.

The second type of TDM's can be referred to as statistical multiplexers or intelligent multiplexers wherein data from communications channels are formed into frames for synchronous transmission over a data link. In such multiplexers, frames are also used for control purposes. Accordingly, each frame is formatted to identify its type, the channel it is associated with (if any), the number of bytes of data, if it contains data, and other administrative information. Protocols for the transmission of frames (sometimes referred to as packets) have been developed and include the synchronous Data Lind Control (SDLC) protocol and Recommendation X.25 of the Consultative Committee for International Telephone and Telegraph (CCITT). A data frame is created for a particular channel only when data is to be transmitted, thereby avoiding the dedicated time slots of conventional time division multiplexers.

Prior art asynchronous multiplexers have also been adapted for use with synchronous channels. Such adaptations include protocols for recognizing and buffering synchronous data so that frames may be utilized. A second adaptation involves dedicating time slots for synchronous data, a technique that is analogous to conventionally time division multiplexing frames together with synchronous data.

The prior art multiplexers have considerable disadvantages which the present invention overcomes. The conventional TDM had the disadvantage of inefficient use of the data link inasmuch as time slots are dedicated regardless of whether each channel is utilizing its dedicated time slots. For channels which are communicating for large periods of time, the use of the data link is extremely inefficient. With respect to prior art statistical multiplexers, the technique of interleaving synchronous data with frames utilizes fixed time slots—thus resulting in inefficient use of the data link when the fixed time slots are not utilized to capacity. Buffering of synchronous data into frames is a technique which also adds complexity to the multiplexer design.

It is therefore an object of the invention to provide an improved statistical multiplexer for multiplexing synchronous and asynchronous data channels.

A further object of the disclosed invention is to provide an improved multiplexer wherein bandwidth is allocated on a dynamic basis for synchronous and asynchronous data channels.

Another object of the invention is to provide an improved multiplexer for synchronous data channels wherein synchronous channel data is not buffered into frames.

A further object of the invention is to improve statistical multiplexers and provide the dynamic multiplexing of asynchronous and synchronous data channels in such a manner that the statistical multiplexers are transparent to the synchronous channel data.

SUMMARY OF THE INVENTION

The foregoing and other objects of the invention are accomplished in a multiplexer system which includes control logic for creating frames (or packets). According to the invention, these frames may be one of two types, a first type containing control information pertaining to synchronous data transmissions or a second type containing data from asynchronous channels. The system further includes a synchronous port interface for interfacing with synchronous data communications equipment (DCE) such as modems, and with data terminal equipment (DTE) such as computers. The synchronous port interface includes decoder and timing circuitry responsive to predetermined control frames which are provided by the control logic of a local or remote multiplexer. In response to such predetermined control frames, the synchronous port interface provides timing and synchronous data to or from the synchronous data equipment coupled to the synchronous port interface. The control logic effectively allocates transmit time slots to the individual synchronous channels which require bandwidth and de-allocates transmit time slots that are not being utilized. The control logic further controls the transmit output of asynchronous frames it creates so that asynchronous frame bits do not coincide with time slots allocated for synchronous data channels. The synchronous port interface further provides control signals so that the synchronous channel data in the composite received data is not utilized by the control logic in processing received asynchronous frames.

BRIEF DESCRIPTION OF THE DRAWINGS

The foregoing and other advantages and features of the invention will be readily apparent to persons skilled in the art from the following detailed description of the invention when read in conjunction with the drawing wherein.

DETAILED DESCRIPTION OF THE INVENTION

The following description is provided to enable persons skilled in the art of electronic data communications to make and use the present invention, and sets forth the best modes contemplated by the inventors for carrying out their invention. Various modifications, however, will be readily apparent to persons skilled in the art inasmuch as the principles of the disclosed invention are directed to a statistical multiplexer wherein bandwidth is allocated to both asynchronous and synchronous channels on a dynamic basis. The present invention utilizes commercially available shelf item electronic component parts, examples of which are referred to herein.

Figure 1:
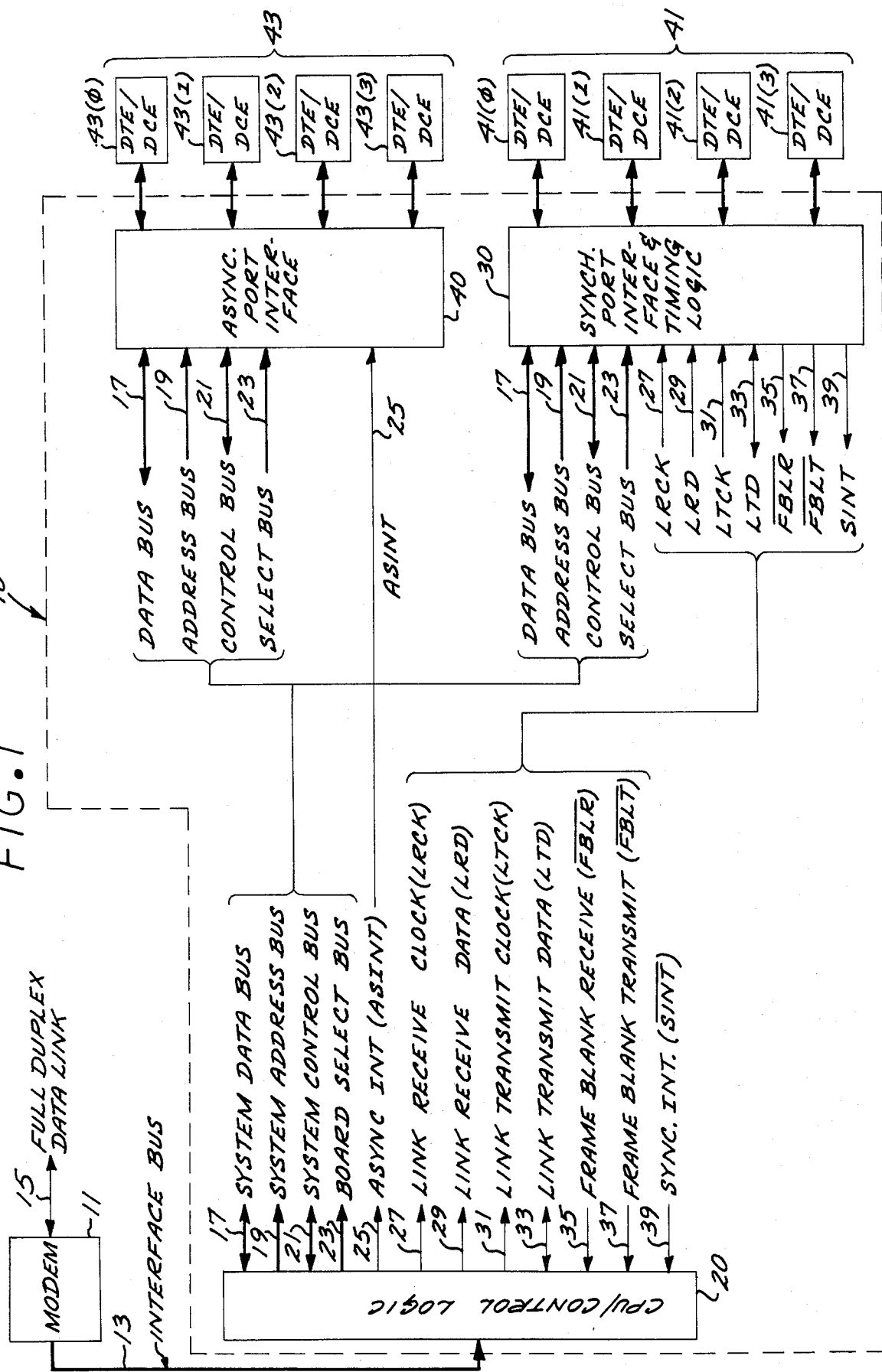
FIG. 1 is a block diagram of the disclosed statistical multiplexer.

Referring now to FIG. 1, illustrated therein is a general block diagram of the major subsystems of the disclosed multiplexer 10. Particularly, the multiplexer 10 includes a central processing unit (CPU)/control logic 20, a synchronous port interface and timing logic 30, and an asynchronous port interface 40. The multiplexer 10 communicates with a serial data link via a data modem 11 which is coupled to the CPU/control logic 20 by an interface bus 13. It is contemplated that the interface bus 13 utilize signals compatible with EIA (Electronic Industries Association) RS-232C, RS-422, or RS-423 standards. The modem 11 is in turn connected to a full duplex data link 15, such as a four-wire private line leased from a telephone utility. Typically, the modem 11 may be a high speed modem capable of operating at rates up to 9600 bits per second (BPS). The multiplexer 10 can also be used, of course, on digital communications links where a modem would not be required. Thus, it is contemplated that the disclosed multiplexer 10 function in full duplex mode although, as will be readily apparent, the individual channels to the multiplexer can operate in half duplex mode.

Referring now to the right side of the CPU/control logic 20, a plurality of signal buses and lines are shown which are utilized to communicate with the synchronous port interface 30 and the asynchronous port interface 40. Specifically, a data bus 17 is provided for communicating system data which includes control data as well as user data received or transmitted by the disclosed multiplexer 10. A system address bus 19 is provided to allow the CPU/control logic 20 to address or enable memories or devices in the synchronous port interface 30 or the asynchronous port interface 40. A system control bus 21 is utilized for housekeeping matters such as read and write enable and memory ready. A board select bus 23 is further provided to address particular synchronous port interfaces and asynchronous port interfaces inasmuch as a plurality identical port interfaces may be included in the disclosed multiplexer 10. Thus, it is also contemplated that each of the port interfaces occupy an individual circuit board separate from the CPU/control logic, and each of such port interfaces is uniquely addressable via the board select bus 23.

The signal lines coupled to the CPU/control logic 20 are identified by the respective information they communicate as well as the signal symbols set forth in parenthesis that are associated with such signal lines. For ease of reference and understanding, the signal symbols will be utilized in this disclosure.

An interrupt line 25 is provided for communicating a periodic interrupt signal ASINT to the asynchronous port interface 40. The interrupt signal ASINT is utilized to cause the asynchronous port interface 40 to restart a predetermined routine on each interrupt to process any data transmitted to or from any data devices associated with the asynchronous port interface 40. Also, the system data bus 17, the system address bus 19, the system control bus 21, and the board select bus 23 are coupled to the asynchronous port interface 40.

A plurality of signal lines are provided for communication of specific signals between the CPU/control logic 20 and the synchronous port interface 30, and includes a link receive clock line 27 for providing a link receive clock signal associated with the data received by the modem 11 over the data link 15. A link receive data line 29 is provided for communicating the link receive data received by the modem 11. Associated with the link receive data LRD is the link receive clock signal LRCK.

Further, a link transmit clock line 31 communicates a link transmit clock signal LTCK that is associated with the link data transmitted via the modem 11. Such link transmit data LTD is communicated on a link transmit data line 33. That line is shown as being bi-directional since, as will be discussed more fully herein, the synchronous port interface examines the data on that line and further bit interleaves synchronous data bits onto this line. The composite link data LTD including synchronous data bits is transmitted by the modem 11.

For timing purposes, a frame blank receive signal $\overline{FBLR}$ is provided from the synchronous port interface 30 to the CPU/control logic 20 via a line 35. The signal $\overline{FBLR}$ is used to selectively prevent the CPU/control logic 20 from reading the link receive data LRD bits that correspond to synchronous receive data that is utilized by the synchronous port interface 30. A frame blank transmit signal $\overline{FBLT}$ is also provided for timing purposes from the synchronous port interface 30 to the CPU/control logic 20. The signal $\overline{FBLT}$ is used to selectively prevent the CPU/control logic from providing frame transmit data during those time slots that are allocated to synchronous data from the synchronous port interface 30.

Frame transmit data is not lost because of the frame blank signal $\overline{FBLT}$ since the CPU/control logic 20 allocates the required time slots for synchronous transmit data and will avoid the coincidence of frame data with synchronous data from the synchronous port interface 30. Thus, for transmit purposes, the frame data is bit interleaved with synchronous data, if any, from the synchronous port interface 30.

In regard to link received data LRD, the frame blank signal $\overline{FBLR}$ effectively causes the bit interleaved receive data to be divided into frame data accepted by the CPU/control logic 20, and synchronous data utilized by the synchronous port interface 30. As will be discussed fully herein, the synchronous port interface 30 only examines the data bits corresponding to frame data for the presence of predetermined control frames that are used to control the synchronous port interface 30. Such control frames are provided by the CPU/control logic 20 and are used by both local and remote multiplexers so that the respective synchronous port interfaces are configured properly.

A synchronous interrupt line 39 is provided from the synchronous port interface 30 to the CPU/control logic 20. This line is used for communicating an interrupt signal SINT indicative of a change in the EIA interface control signals from any of the synchronous data devices coupled to the synchronous port interface 30.

As further shown in FIG. 1, the system data bus 17, the system address bus 19, the system control bus 21, and the board select bus are also coupled to the synchronous port interface 30.

In regard to data devices that communicate via the multiplexer 10, data terminal equipment (DTE) such as terminals and data communications equipment (DCE) such as modems can be coupled to the port interfaces 30 and 40. Such DTE/DCE data devices associated with the synchronous port interface 30 are individually identified by the reference numerals 41(0) through 41(3), and are collectively identified by the reference numeral 41. The DTE/DCE devices 41 coupled to the synchronous port interface 40 must be synchronous devices, and it is contemplated that the DTE/DCE devices 41 communicate with the synchronous port interfaces 40 via signals compatible with EIA RS-232C, RS-422, or RS-423 standards.

The DTE/DCE devices associated with the asynchronous port interface 30 are individually identified in FIG. 1 by the reference numerals 43(0) through 41(3), and are collectively identified by the reference numeral 43. The DTE/DCE devices 43 coupled to the asynchronous port interface 30 must be asynchronous devices, and preferably utilize interface signals compatible with EIA RS-232C, RS-422, or RS-423 standards.

Figure 2:
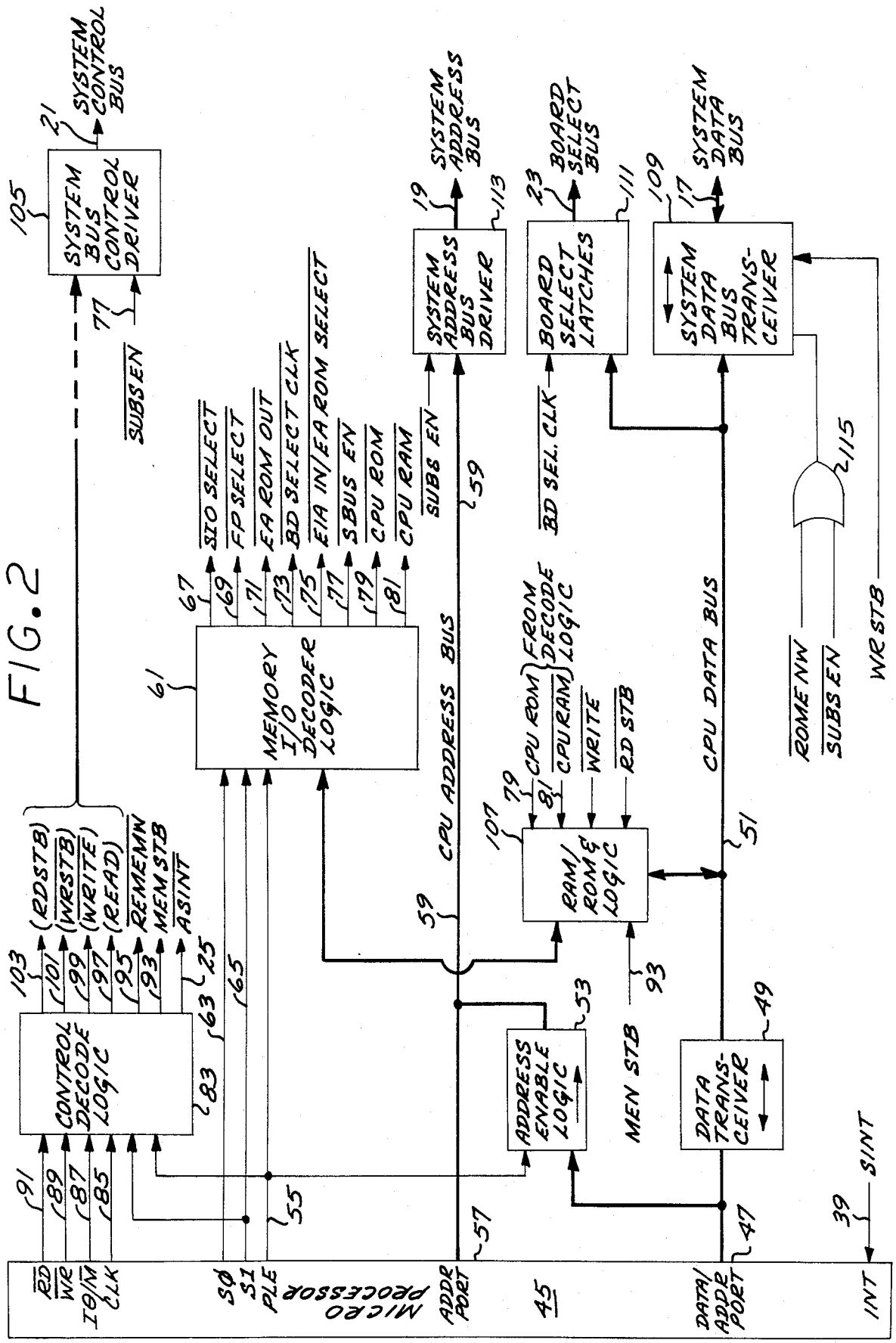
FIGS. 2 and 3 are diagrams of elements of the CPU/control logic set forth in FIG. 1.

Referring now to FIG. 2, shown therein is a block diagram of the CPU/control logic 20 which includes a large scale integrated circuit (LSI) microprocessor 45. Many LSI microprocessors are commercially available, and for the disclosed preferred embodiment the inventors have utilized the Intel 8085A processor. Thus, some of the logic discussed herein is due to the characteristics of the Intel 8085A. However, it will be readily apparent to persons skilled in the art that other LSI microprocessors could be implemented.

A multiplexed bi-directional data/address port 47 is provided by the microprocessor 45 to transmit or receive data, and is also used to transmit the least significant eight (8) bits of an address. The data/address port 47 is coupled to an integrated circuit 8-bit transceiver 49 which is appropriately enabled to receive or transmit data. An example of a commericially available transceiver is the type LS245 device. Control of such a transceiver with the Intel 8085A is well known to persons skilled in the art. The input/output side of the transceiver 49 that is not coupled to the microprocessor 45 comprises the CPU data bus 51.

In parallel with the data transceiver 49 is an address enable logic unit 53 that is selectively enabled by an address latch enable signal ALE on an output line 55 from the microprocessor 45. The signal ALE indicates that an address is being latched into the on-chip latches of the microprocessor 45. The address enable logic unit 53 can comprise an integrated circuit having D-type transparent latches such as the Type LS373 device. The output of the address enable logic unit 53 and the output of an address port 57 form a CPU address bus 59.

In the disclosed embodiment, various devices and subsystems (to be discussed more fully herein) of the multiplexer 10 (FIG. 1) that are controlled or accessed by the microprocessor 45 are considered to be input/output (I/O) devices for addressing purposes. Therefore, a memory I/O decode logic circuit 61 is provided for addressing or enabling memory or I/O devices. Inputs to the memory I/O logic circuit 61 include address lines from the CPU address bus 59, the address latch enable signal ALE on the line 55, and respective status signals $S_0$ and $S_1$ and lines 63 and 65, respectively. The signal ALE, described previously in regard to address outputs, functions also as a status strobe for timing the use of the status signals $S_0$ and $S_1$. The memory I/O decode logic 61 is adapted to respond to predetermined signals on its inputs and provides outputs accordingly. The implementation of such decode logic circuitry is well understood by persons skilled in the art.

The outputs of the memory I/O decode logic 61 includes an SIO select line 67 for enabling a serial input/output device for handling the protocols associated with the data and control frames generated by the CPU/control logic 20.

An output line 69 provides a front panel select signal FPSEL for selecting circuitry associated with a front panel keyboard and display.

Another output line 71 provides a signal $\overline{EAROM}$ $\overline{OUT}$ to access an Electrically Alterable Read Only Memory (EAROM) which is utilized to store configuration parameters that are not continuously changed and which can tolerate the relatively longer time required to change the contents of an EAROM.

Output line 73 provides a signal $\overline{BDSEL\ CLK}$ which enables latches associated with the board select function to latch into output states in accordance with the data on particular CPU data bus lines that provide inputs to such latches.

Another output line 75 from the memory I/O decode logic 61 transmits a signal identified as EIA IN/EAROM which selectively turns on a 2-to-1 multiplexer having three-state outputs. As discussed below, the output of a predetermined CPU address line controls the output of the referenced 2-to-1 multiplexer.

An output line 77 provides a signal $\overline{SBUS\ EN}$ for enabling communication via the system data bus 17, the system address bus 19 and the system bus control bus 21, shown in FIG. 1.

The remaining output lines 79 and 81 provide the signals $\overline{CPU\ ROM}$ and $\overline{CPU\ RAM}$ for enabling access to ROM and RAM associated with the microprocessor 45.

For control purposes, a control decode logic circuit 83 accepts CPU control signals from the microprocessor 45 and provides, in response thereto, signals for controlling I/O devices that communicate via the system data bus 17 and the system address bus 19. Inputs to the control decode logic 83 include the signals ALE and $S_1$ on the lines 55 and 65, respectively. Another input to the control decode logic 83 is provided by a line 85 having a signal CLK that can be used as a system clock. A line 87 provides a signal IO/M that indicates whether a read/write operation is to an I/O device or to memory. A write signal WR and a read signal RD are provided on line 89 and 91, respectively. The write signal WR indicates whether data on the CPU data bus is to be read and that the CPU data bus 51 is available for data transfer.

The foregoing inputs are utilized by the control decode logic 83 to provide control outputs that include a signal $\overline{ASINT}$ on the line 93 that is coupled to the asynchronous port interface 40 (FIG. 1). The $\overline{ASINT}$ signal is a divided down version of the clock signal CLK on the line 85 and is used to provide a real-time interrupt signal to the asynchronous port interface 40. A signal MEMSTB on a line 93 enables the ROM or RAM associated with the microprocessor 45. A read/write memory signal $\overline{RDMEMW}$ indicates whether such ROM or RAM is being accessed, and is on a line 85. A signal $\overline{READ}$ on a line 97 indicates whether a read operation is to be performed, and a signal $\overline{WRITE}$ on a line 99 indicates whether a write operation is to be performed.

A write strobe $\overline{WRSTB}$ and a read strobe $\overline{RDSTB}$ are provided on respective lines 101 and 103.

Selected outputs of the control decode logic 83 are inputted to a system bus control driver 105, which by way of example can be a Type LS241 integrated circuit octal buffer with three-state outputs. The signal $\overline{SBUS}$ $\overline{EN}$ on the line 77 from the memory I/O decode logic 61 selectively enables the system bus control driver 105. The output of the system bus control driver 105 is to the system control bus 21, shown also in FIG. 1.

Referring now to the CPU data bus 51 and the CPU address us 59, these buses are coupled to random access memory (RAM), read only memory (ROM), and associated logic as illustrated with the reference numeral 107. The RAM/ROM logic circuitry is enabled by the memory strobe signals MEMSTB from the control decode logic 83. The memory select signals $\overline{CPU}$ $\overline{ROM}$ and $\overline{CPU}$ $\overline{RAM}$ from the memory I/O decode logic 61 select whether ROM or RAM is being accessed.

The CPU data bus 51 is further coupled to a system data bus transceiver 109, which can comprise a commercially available octal transceiver with tri-state output such as the Type LS245. The output of the transceiver 109 is to the system data bus 17 previously discussed in relation to FIG. 1.

Certain data lines of the CPU data bus 51 provide a data input into an array of board select latches 111, which has its output coupled to the board select bus 23 previously discussed in relation to FIG. 1. The board select latches 111 are selectively enabled by the signal $\overline{BDSEL}$ $\overline{CLK}$ from the memory I/O decode logic 61.

The CPU address bus 59 is coupled to a system address bus driver 113, which by way of example can comprise two Type LS240 octal buffers. The system address bus driver 113 is selectively enabled by the signal $\overline{SBUS}$ $\overline{EN}$ from the memory I/O decode logic 61. The bus driver 113 output provides the system address signals on the system address bus 19 which is shown also on FIG. 1.

Figure 3:
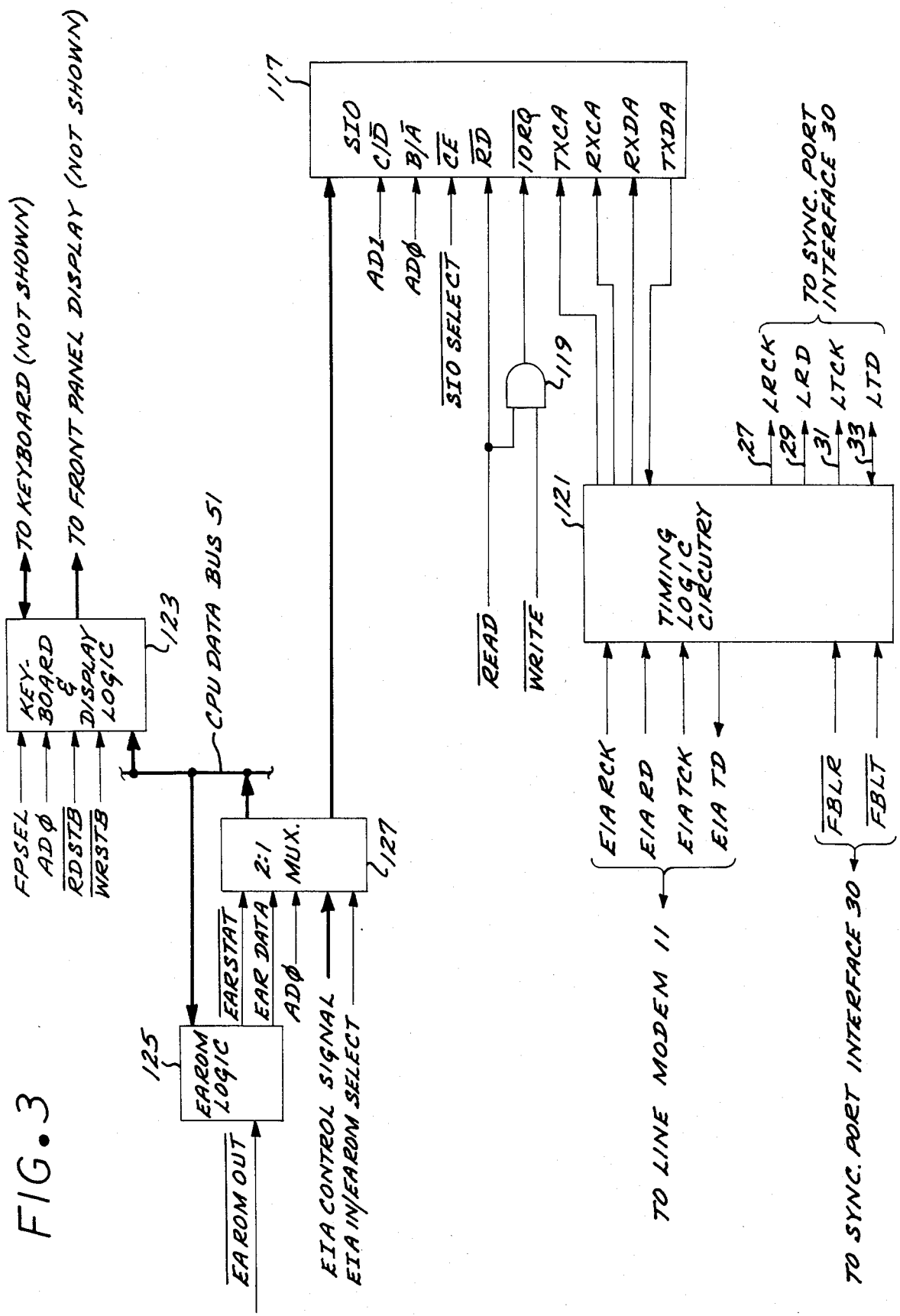

Further memory-mapped I/O devices associated with the microprocessor 45 (shown in FIG. 2) are set forth in FIG. 3 wherein part of the CPU data bus 51 is illustrated. Coupled to the CPU data bus 51 is a serial input-output device (SIO) 117 for formatting asynchronous data and control data into frames in accordance with a predetermined protocol. The SIO 117 can be a commercially available integrated circuit device such as the Zilog Z80-SIO. The SIO 117 is enabled by the SIO SELECT signal from the memory I/O decode logic 61 (FIG. 2) which is applied to the chip enable input CE of the SIO 117.

The address line AD0 from the CPU address bus 51 (FIG. 2) is used for selection of channel A or B for data transfer. In this embodiment, it is contemplated that only channel A is used, and therefore address line AD0 provides a low signal when data is to be transferred. The address line AD1 from the CPU address bus 59 to the C/D input of the SIO 117 is used to define whether information on the CPU data bus 51 for the SIO 117 is control information (C) or data (D).

The read input $\overline{RD}$ and the input/output request input $\overline{IORQ}$ are controlled by the $\overline{READ}$ and $\overline{WRITE}$ signals from the control decode logic 83. When either READ or WRITE is active (low), then the output of an AND gate 119 will be low and therefore $\overline{IORQ}$ will be active. Whether the input/output function is a read or write is indicated by the $\overline{READ}$ signal, which is active (low) when data is to be transferred from the SIO 117 to the microprocessor 45 in a read operation.

Further coupled to the SIO 117 is timing logic circuitry 121 which also functions in cooperation with the synchronous port interface 30. In regard to the transmission of interleaved composite data over a data link, the timing logic 121 combines control frame bits or asynchronous data frames bits from the SIO 117 output TXDA with synchronous data from the synchronous port interface 30. The synchronous data bits are on the line 33 which communicates the link transmit data LTD. As will be discussed below, the synchronous port interface 30 appopriately inserts synchronous data bits on the line 33 while at the same time examining the data from the SIO 117 output TXDA for pertinent control frames. Appropriate control frames provide the synchronous port interface 30 with information necessary to synchronize the synchronous outputs of the respective DTE/DCE 41 to the appropriate time slots. The composite link transmit data LTD on the line 33 is converted from 'TTL (transistor-transistor logic) to EIA levels and provided to the link modem 11 as the signal EIA TD out of the timing logic 121.

An EIA link transmit clock EIA TCK inputted to the timing logic 121 is converted to TTL logic levels, and is provided as the signal LTCK to the synchronous port interface 30 on the line 31. The clock signal LTCK is also modified in response to the transmit frame blank signal $\overline{FBLT}$ and the modified signal is provided to the TXCA input of the SIO 117. Effectively, the transmit frame blank signal $\overline{FBLT}$ selectively prevents the transmit timing signal LTCK from being provided to the SIO 117 input TXCA. Thus, the SIO 117 will not provide an output on its output TXDA when $\overline{FBLT}$ is active (low).

In regard to data received over the data link by the modem 11, that modem provides an EIA receive clock signal EIA RCK and the EIA receive data signal EIA RD to the timing logic 121. Those EIA compatible signals are converted to the TTL compatible siganls devoted link receive data LRD and link receive clock signal LRCK, which are both provided to the synchronous port interface 30 on the lines 29 and 27, respectively.

The timing logic 121 utilizes the receive frame blank signal $\overline{FBLR}$ to inhibit the TTL receive clock signal LRCK from being inputted to the RXCA input of the SIO 117 during those time slots that have been assigned to synchronous data. Thus, the SIO 117 does not read the signal LRD on its input RXDA when $\overline{FBLR}$ is active (low). As will be discussed, appropriate control frames received by the synchronous port interface 30 adapt timing logic circuits in the synchronous port interface 30 to control the signal $\overline{FBLR}$.

Further shown in FIG. 3 is a keyboard and display logic circuit 123 which can comprise an integrated circuit keyboard/display controller such as the Intel 8279 and appropriate drivers. The keyboard/display logic 123 is coupled to the CPU data bus 51 for transfer of information to or from the microprocessor 45. The keyboard/display logic 123 is addressed by the front panel select signal FP SEL from the memory I/O decode logic 61 (FIG. 2) and the zero bit AD0 from the CPU address bus 59. The read and write strobe signals RDSTB and WRSTB from the control decode logic 83 control the direction of information transfer between the keyboard/display logic 123 and the microprocessor 45. The keyboard/display 123 is coupled to a keybaord (not shown) and a display (also not shown) which can be mounted on the front panel of a suitable housing for the multiplexer. Configuration and other parameters can be entered via the keyboard.

FIG. 3 also shows a circuit block 125 for an electrically alterable read only memory (EAROM) and its associated logic. The EAROM/logic 125 receives inputs via the CPU data bus 51, and is accessed by the signal EAROM OUT from the memory I/O decoder 61. The outputs of the EAROM/logic 125 are coupled to a two-to-one multiplexer 127, such as a type LS257 integrated circuit. The output of the multiplexer 127 is coupled to the CPU data bus 51.

The other inputs to the multiplexer 127 are TTL versions of EIA control signals from the link modem 11. The multiplexer 127 provides three-state outputs, and is enabled by the signal EIA/EAROM SELECT from the memory I/O decode logic 61. Selection of inputs to the multiplexer 127 is controlled by the logic level of the zero bit AD0 of the CPU address bus 59.

Figure 4:
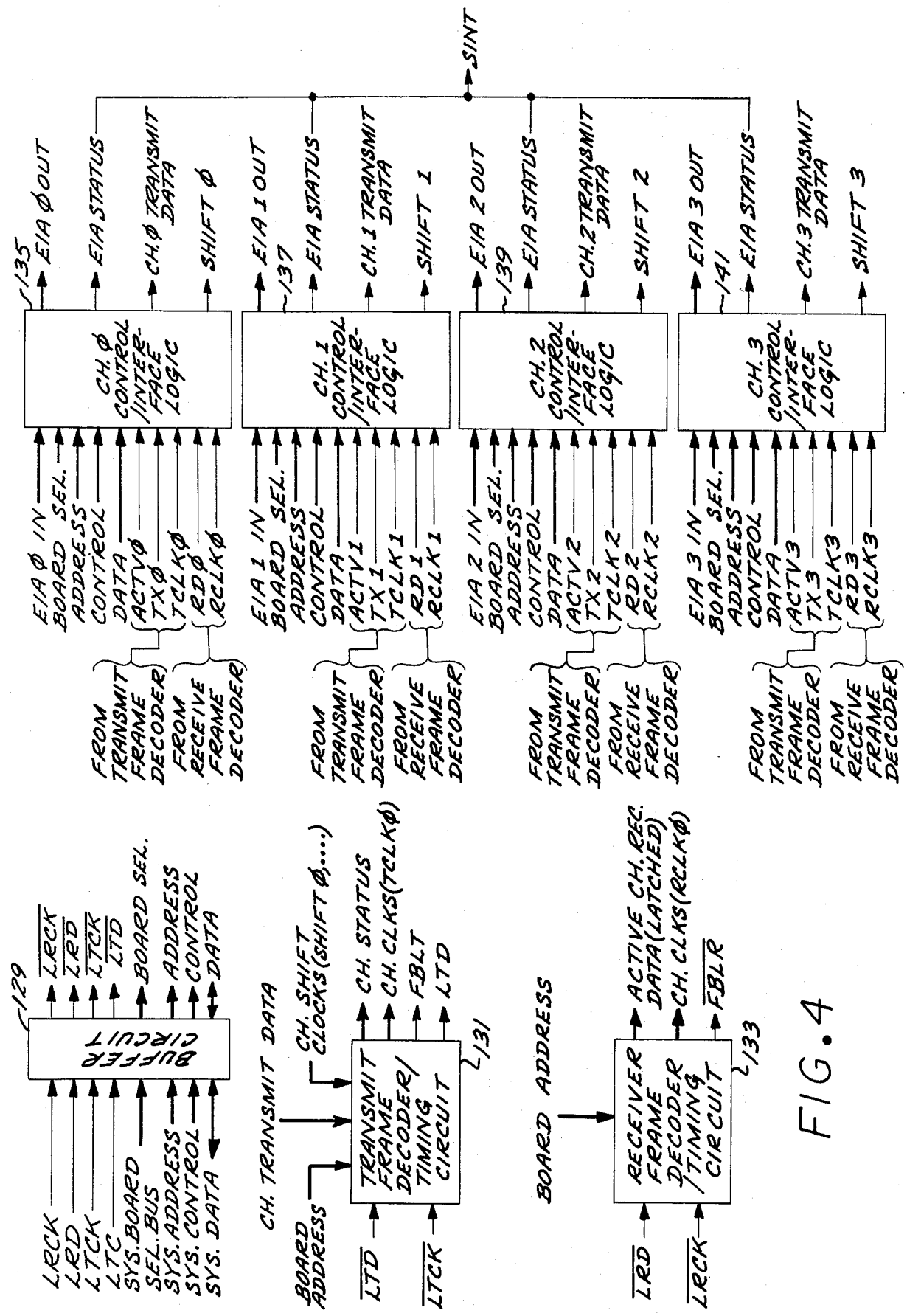
FIG. 4 is a block diagram of the synchronous port interface and timing logic shown in FIG. 1.

Referring now to FIG. 4, shown therein is a block diagram of the synchronous port interface 30, previously set forth in FIG. 1, which includes buffer circuitry 129 for providing buffered signals to the synchronous port interface 30 circuit board. Particularly, the link receive clock signal LRCK, the link receive data signal LRD, the link transmit clock signal LTCK, and the link transmit data signal LTD as provided by the timing logic circuit 121 (FIG. 3) are buffered to provide the respective buffered signals, $\overline{\text{LRCK}}$, $\overline{\text{LRD}}$, $\overline{\text{LTCK}}$, and $\overline{\text{LTD}}$. Further, the signals comprising the system board select bus are buffered to provide board select data for the synchronous board interface circuit board. Also, selected bits from the system address bus 19 are buffered to provide address information, and the signals on the system control bus 21 are buffered to provide control information. In regard to the system data bus 17, the buffer circuits 129 provide bi-directional buffering so that data can be both placed on the system data bus as well as received from the system data bus 17.

The synchronous port interface 30 of FIG. 4 further includes a transmit frame decoder/timing circuit 131 which is responsive to predetermined control frames provided by the CPU/control logic 20. Thus, inputs to the transmit frame decoder 131 include the buffered link transmit data signal $\overline{\text{LTD}}$ and the buffered link transmit clock signal $\overline{\text{LTCK}}$ as provided by the buffer circuits 129. Further inputs to the transmit frame decoder/timing circuit 131 include individual channel shift clocks (SHIFT 0, SHIFT 2, SHIFT 3) for each channel that is active. These shift clocks can be derived from the transmit frame decoder/timing circuit 131 or from timing signals provided by the DTE/DCE associated with a particular channel.

A further input to the transmit frame decoder/timing circuit 131 is the circuit board address associated with a particular synchronous interface circuit board. That board address is defined by its physical location in a chassis that is contemplated to have a plurality of circuit board slots into which several synchronous port interface boards 20 and/or asynchronous port interface boards 40 can be interchangeably placed. Thus, each circuit board slot provides a unique combination of electrical signals which comprise the board address to the circuit board associated with a particular circuit board slot. Such board addresses are utilized by circuitry on the respective circuit boards to determine whether it is being addressed. Of course, the configuration of the multiplexer, as determined by the locations of the various boards and the rates of the devices coupled to the channels of the interface boards must be entered via the front panel display and keyboard as discussed above in conjunction with the keyboard and display logic 123 (FIG. 3).

Outputs from the transmit frame decoder 131 include four channel status lines, one for each of the synchronous channels associated with the synchronous port interface, which identify whether a particular channel is active or inactive. The transmit frame decoder 131 further provides four channel transmit clock signals (TCLK0, TCLK1, TCLK2, TCLK3) corresponding to the respective four channels associated with the synchronous port interface circuit board. Of course, such clocks are provided only for those channels that are active. The transmit frame decoder 131 also provides the transmit frame blank signal $\overline{\text{FBLT}}$ which, as discussed above, is utilized by the CPU/control logic 20 to prevent asynchronous data from being transmitted during those time periods that have been assigned to synchronous data.

Since all control frames are examined by all of the synchronous port interface circuit boards in the multiplexer, a control frame must uniquely identify which board it is intended for. Moreover, control frames must identify which of the four channels on a synchronous port interface circuit board it pertains to. Also, a control frame must indicate whether a particular channel is being activated or deactivated. If a particular channel is being activated, a control frame is constructed to include information that defines the particular time slot or slots that are being assigned to the channel being activated.

As will be readily apparent to persons skilled in the art, the microprocessor 45 and the SIO 117 of the CPU/control logic 20 can provide uniquely identifiable control frames to which the transmit frame decoder 131 will be responsive.

In response to being configured by appropriate control frames, the transmit frame decoder/timing circuit 131 interleaves data signals from its associated active synchronous channels onto the composite link LTD. This is readily accomplished by ORing the data from the synchronous channels with the link data signal LTD.

The synchronous port interface circuit board of FIG. 4 further includes a receive frame decoder/timing circuit 133 which operates on the buffered composite link receive data $\overline{\text{LRD}}$ and can therefore be considered as the receiving counterpart of the transmit frame decoder 131. Inputs to the receive frame decoder 133 include the board address defined by the physical location of the particular synchronous port interface circuit board, as discussed above relative to the transmit frame decoder 131. A further input to the receive frame decoder/timing circuit 133 is the buffered link receive clock $\overline{\text{LRCK}}$ as provided by the buffer circuits 129.

The receive frame decoder 133 is responsive to predetermined control frames transmitted by a remote multiplexer. Particularly, the receive frame decoder 133 is responsive to only those contol frames which specify the particular board address associated with the receive frame decoder 133. In response to appropriate control frames, the receive frame decoder 133 configures its timing logic circuitry so that the buffered composite receive link data $\overline{\text{LRD}}$ will be time division separated and transmitted to the appropriate active channels.

Thus, it should be evident that as between local and remote multiplexers, there should be a one-to-one correspondence in configuration so that corresponding boards and channels have the same board addresses and channel numbers. It should be noted that although the local and remote multiplexers must communicate in full duplex mode, the individual channels can operate in half duplex mode.

Outputs from the receive frame decoder 133 include four receive data lines for providing the respective digital data bits associated with each channel. Each of the receive data output lines provides a latched data output which is coupled to appropriate circuitry shown in FIG. 4 that converts the latched output TTL logic levels to EIA compatible signal levels. The receive frame decoder/timing circuit also provides to the channel control/interface logic circuits individual receive clocks (RCLK0, RCLK1, RCLK2, RCLK3) which are converted to EIA compatible logic levels and ultimately provided to respective DTE/DCE devices associated with the active receive channels.

Another output from the receive frame decoder/timing circuit 133 is the receive frame blank signal $\overline{FBLR}$ which, as discussed above, is utilized by the CPU/control logic 20 to prevent reading those receive data bits that correspond to synchronous data.

Associated with each of the four channels (0 through 3) of the synchronous port interface circuit board depicted in FIG. 4 is a channel control/interface logic circuit which generally functions to control communication between the multiplexer 10 and the synchronous data devices 41 (FIG. 1) which are utilizing the multiplexer. Shown in FIG. 4 for channels 0 through 3 are channel control/interface logic blocks identified with the reference numerals 135, 137, 139 and 141, respectively. All of the channel control/interface logic circuits 135, 137, 139 and 141 are substantially identical in function, but are coupled to different data devices and are responsive to different signals from the transmit frame decoder/timing circuit 131 and the receive frame decoder/timing circuit 133.

The inputs to the respective channel control/interface logic circuits include EIA compatible signals (EIA0, EIA1 IN, EIA2 IN, EIA3 IN) outputted by the data device (DTE or DCE) associated with a particular channel control/interface logic circuit. Inputs common to all of the channel control/interface logic circuit 135, 137, 139 and 141 include the board select data, selected address information signals, and data from the buffer circuits 129. Further, each of the channel control/interface logic circuits receive respective channel status signals (ACTV0, ACTV1, ACTV2, ACTV3), and channel transmit clocks (TCLK0, TCLK1, TCLK2, TCLK3) from the transmit frame decoder/timing circuit 131.

From the receive frame decoder/timing circuit 133, the channel control/interface logic circuits receive respective latched receive data signals. The channel control interface logic circuits convert the respective receive data signals to EIA compatible logic levels which are provided to respective DTE/DCE devices. The respective channel control/interface logic circuits also receive, for active channels, the individual receive clocks (RCLK0, RCLK1, RCLK2, RCLK3) from the receive frame decoder/timing circuit 133. These clock signals are appropriately converted to EIA compatible logic levels which are provided to respective DTE/DCE devices 41 (FIG. 1).

Outputs from the channel control/interface logic circuits include EIA compatible signals (EIA0 OUT, EIA1 OUT, EIA2 OUT, EIA3 OUT), including receive data and clock signals, which are provided to the respective data devices associated with the channels 0 through 3. A further output from each of the channel control/interface logic circuits is an EIA status signal that indicates whether any of the EIA compatible status signals (e.g., CTS, RTS) inputted into a particular channel control/interface logic circuit has changed. All of the EIA status lines from the four channel control/interface logic circuits are OR'd to provide the $\overline{SINT}$ signal that is indicative of a change of one of the EIA compatible status signals provided to the synchronous port interface circuit board. The synchronous interface interrupt signal $\overline{SINT}$ is provided as an interrupt input to the microprocessor 45 (FIG. 2) to indicate that the EIA status of one or more devices coupled to a particular synchronous port interface circuit board has changed.

In response to the $\overline{SINT}$ signal, the microprocessor 45 will appropriately execute a predetermined routine for interrogating the channel control interface logic circuits to determine the nature of any changes. For example, when one of the data devices 41 raises its request to send (RTS) signal, the microprocessor 45 will have to determine which channel is requesting link bandwidth. Similarly, when one of the data devices 41 drops its RTS signal, the microprocessor 45 will have to determine which channel no longer requires bandwidth so that the bandwidth allocated to such channel can be de-allocated.

Each channel control/interface logic circuit also provides as an output a transmit data signal which is the TTL logic level version of the EIA compatible transmit data signal provided by its associated DCE or DTE data device. The transmit data signal is utilized by the transmit frame decoder/timing circuit 131 so that the transmit data from all of the active channels can be appropriately interleaved and incorporated into the link transmit data LTD. Another output from each of the channel control/interface logic circuits is the shift clock signal (SHIFT0, SHIFT1, SHIFT2, SHIFT3) which is utilized by the transmit frame decoder/timing circuit 131 for storing transmit data from the respective channels in buffers for subsequent interleaving with the link transmit data LTD. As previously discussed, the shift clocks can be derived from the transmit clock signals (TCLK0, etc.) provided by the transmit frame decoder/timing circuit 131 or from clock signals provided by the respective data devices 41.

As will be readily apparent to persons skilled in the art, each channel control/interface logic circuit (135, 137, 139, 141) can be based on a peripheral interface integrated circuit such as the Intel 8255A programmable peripheral interface. Each channel control/interface logic circuit would include circuitry responsive to the buffered BOARD SEL and ADDRESS signals for selectively enabling the peripheral interface. Logic circuitry for loopback and for choosing which clock signal the transmit shift signal (SHIFT0, etc.) would also be included. Of course, each channel control/interface logic circuit also includes standard circuitry for EIA to TTL and TTL to EIA conversions.

Figure 5:
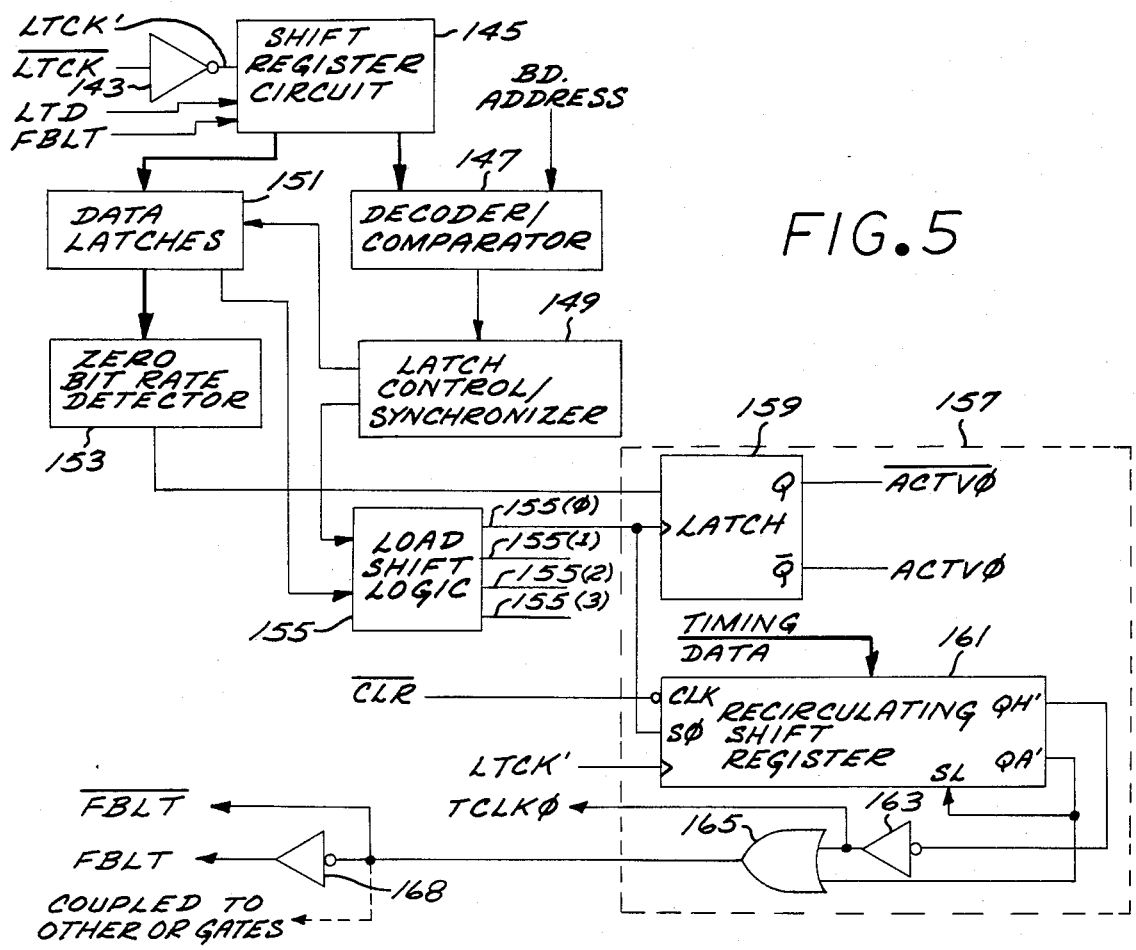
FIGS. 5 and 6 are schematic diagrams of the transmit frame decoder/timing circuit shown in FIG. 4.
Figure 6:
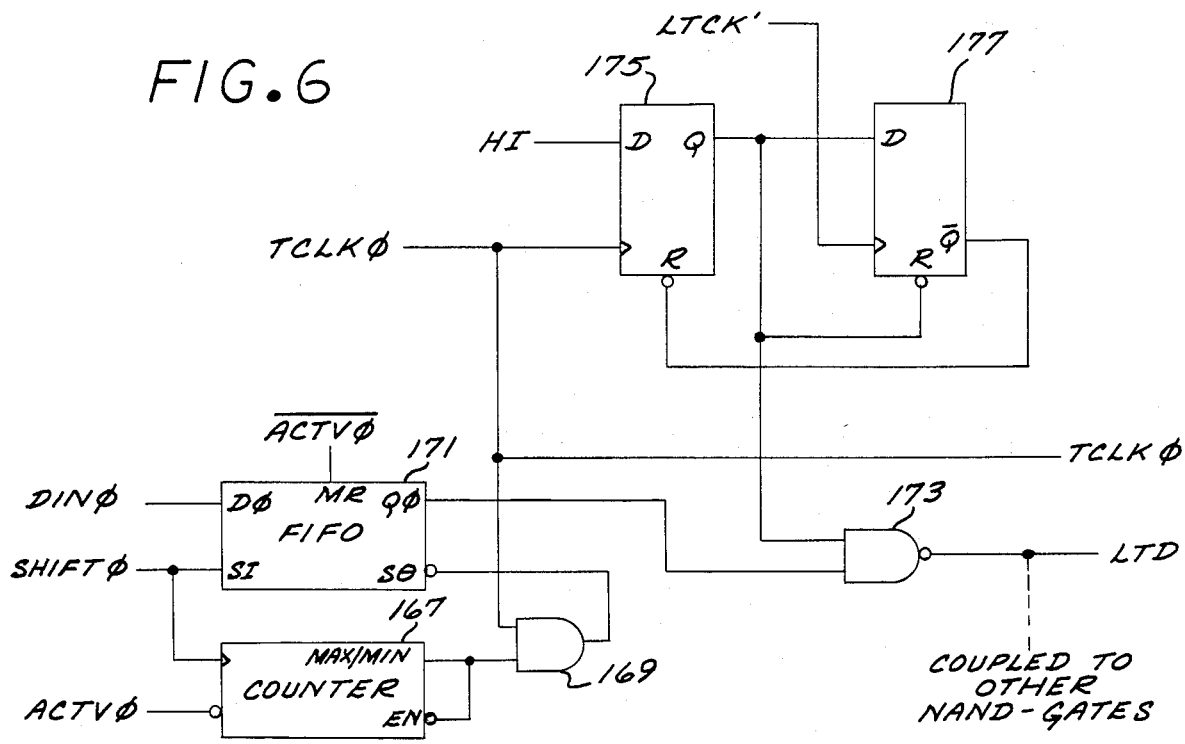

The transmit frame decoder/timing circuit 131 is shown in more detail in FIGS. 5 and 6. Particularly, FIG. 5 includes an inverter 143 that provides an inverted version LTCK' of the buffered link transmit clock $\overline{LTCK}$. A shift register circuit 145 is responsive to LTCK', the buffered link transmit data LTD, and the transmit frame blank signal FBLT. The transmit data $\overline{LTD}$ is clocked by LTCK' into the shift register circuit 145 when FBLT is low. As will be shown later with respect to FIG. 5, FBLT is high when a particular time slot is allocated to synchronous data. Accordingly, the data shifted into the shift register circuit 145 is only frame data from the CPU/control logic 20 (FIG. 1) and will be either asynchronous data containing frames or control frames. The asynchronous data containing frames would be based on asynchronous transmit data provided to the asynchronous port interface 40 by the DTE/DCE devices 43. The generation of such data containing frames is well known and will not be discussed further.

Control frames for transmission are generated by the SIO 117 (FIG. 3) under control of the CPU 45 (FIG. 2). The transmit frame decoder/timing circuit 131 is responsive only to a predetermined control frame of predetermined length which is identified by a particular flag character at the beginning of the control frame. The control frame further includes board address information, channel data, and timing data.

Included in the circuit of FIG. 5 is a decoder/comparator circuit 147 which responds to selected data bit locations in the shift register circuit 145. The decoder/comparator circuit 147 also receives the board address of the particular synchronous port interface as an input. The decoder/comparator circuit 147 is responsive to the predetermined flag character and board address information that matches the board address. When that occurs, a latch control/synchronizer circuit 149 is enabled.

The latch control/synchronizer circuit 149 enables a plurality of data latches 151 to accept timing data and channel data from the control frame in the shift register circuit 145. The channel data identifies which of the four channels of the synchronous port interface is associated with the timing data in the particular control frame. Typically, for a four channel synchronous port interface, the channel data would comprise two bits.

Table I below identifies the possible contents of the timing data as a function of channel speed defined in fractions of link speed. The right hand column of Table I identifies the time slots or link bits which are allocated in response to the associated timing data set forth in the left hand column of Table I.

The timing data latched into the data latches 151 is provided to a zero bit rate detector 153 which determines whether the timing data contains all zeroes or not. If the timing data does not contain all zeroes, the zero bit rate detector provides a low output; otherwise it is high for all timing data that contains all zeroes.

The channel data is provided to a load/shift circuit 155 which is selectively enabled by the latch control/synchronizer 149. By way of example, the load/shift logic circuit 155 could be a commercially available integrated circuit that accepts a two bit input and enables one out of four output lines on the appropriate enabling input pulse.

It is contemplated that the load/shift logic circuit is enabled after a predetermined number of clocks of the clock signal LTCK' subsequent to the detection of a control frame. That assures synchronization between the local and remote multiplexers.

The load/shift logic circuit 155 provides four outputs, only one of which will be high when the load/shift logic circuit 155 is enabled. Those four outputs are respectively associated with the four channels of the synchronous port interface 30 (FIG. 1), and are identified by the reference numerals 155(0), 155(1), 155(2), and 155(3).

Associated with each output of the load/shift logic circuit 155, and accordingly respectively associated with a particular channel, is a channel transmit timing cirucit. For ease of illustration, only one such channel transmit timing circuit 157 is shown and is associated with channel 0.

The channel 0 transmit timing circuit 157 includes a latch 159 that receives as its input the output from the zero bit rate detector 153. The latch 159 is clocked by the output 155(0) of the load shift logic 155. The latch 159 provides outputs signals ACTV0 and $\overline{ACTV0}$ which are inverses of each other. The signal ACTV0 is provided to the channel 0 control/interface logic 135 (FIG. 4), and could be utilized to generate the EIA compatible clear to send signal (CTS) for the data device 41(0) utilizing channel 0. The signal $\overline{ACTV0}$ will be high when the timing data associated with channel 0 does not contain all zeroes.

The channel 0 transmit timing circuit 157 further includes a recirculating shift register 161, which can comprise an integrated shift register such as a Type LS299 that is biased to shift left. Accordingly, the QA' output is coupled to the shift left (SL) input of the recirculating shift register 161.

The shift register 161 is controlled via its S0 control input to load input data by a high signal from the load/shift logic 155. Otherwise, the shift register 161 operates in the shift mode. The input data is the timing data from

TABLE I

| CHANNEL SPEED | TIMING DATA | | | | | | | | LINK BITS USED | | | | | | | |
|---|---|---|---|---|---|---|---|---|---|---|---|---|---|---|---|---|
| | $D_7$ | $D_6$ | $D_5$ | $D_4$ | $D_3$ | $D_2$ | $D_1$ | $D_0$ | 0 | 1 | 2 | 3 | 4 | 5 | 6 | 7 |
| ½ Link | 0 | 1 | 0 | 1 | 0 | 1 | 0 | 1 | 1 | 0 | 1 | 0 | 1 | 0 | 1 | 0 |
| | 1 | 0 | 1 | 0 | 1 | 0 | 1 | 0 | 0 | 1 | 0 | 1 | 0 | 1 | 0 | 1 |
| ¼ Link | 0 | 0 | 1 | 1 | 0 | 0 | 1 | 1 | 1 | 0 | 0 | 0 | 1 | 0 | 0 | 0 |
| | 1 | 0 | 0 | 1 | 1 | 0 | 0 | 1 | 0 | 1 | 0 | 0 | 0 | 1 | 0 | 0 |
| | 1 | 1 | 0 | 0 | 1 | 1 | 0 | 0 | 0 | 0 | 1 | 0 | 0 | 0 | 1 | 0 |
| | 0 | 1 | 1 | 0 | 0 | 1 | 1 | 0 | 0 | 0 | 0 | 1 | 0 | 0 | 0 | 1 |
| ⅛ Link | 0 | 0 | 0 | 0 | 1 | 1 | 1 | 1 | 1 | 0 | 0 | 0 | 0 | 0 | 0 | 0 |
| | 1 | 0 | 0 | 0 | 0 | 1 | 1 | 1 | 0 | 1 | 0 | 0 | 0 | 0 | 0 | 0 |
| | 1 | 1 | 0 | 0 | 0 | 0 | 1 | 1 | 0 | 0 | 1 | 0 | 0 | 0 | 0 | 0 |
| | 1 | 1 | 1 | 0 | 0 | 0 | 0 | 1 | 0 | 0 | 0 | 1 | 0 | 0 | 0 | 0 |
| | 1 | 1 | 1 | 1 | 0 | 0 | 0 | 0 | 0 | 0 | 0 | 0 | 1 | 0 | 0 | 0 |
| | 0 | 1 | 1 | 1 | 1 | 0 | 0 | 0 | 0 | 0 | 0 | 0 | 0 | 1 | 0 | 0 |
| | 0 | 0 | 1 | 1 | 1 | 1 | 0 | 0 | 0 | 0 | 0 | 0 | 0 | 0 | 1 | 0 |
| | 0 | 0 | 0 | 1 | 1 | 1 | 1 | 0 | 0 | 0 | 0 | 0 | 0 | 0 | 0 | 1 |
| 0 Link | 0 | 0 | 0 | 0 | 0 | 0 | 0 | 0 | 0 | 0 | 0 | 0 | 0 | 0 | 0 | 0 | shift logic 155. Otherwise, the shift register 161 operates in the shift mode. The input data is the timing data from the data latches 151. The shift register 161 is clocked by the clock signal LTCK' from the inverter 143.

In the exemplary Type LS299 integrated circuit, the data locations are identified by the letters A through H. The output QA' and QH' are indicative of the contents of locations A and H respectively. On initial timing data load, it is contemplated that timing data $D_1$ through $D_6$ (Table I) are loaded into locations F through A, and that $D_7$ and $D_0$ are loaded into locations H and G respectively. In the shift mode, the data in B would be shifted into A, the data in A would be shifted into H, and so forth.

After any timing data is loaded, the load/shift logic circuit 155 is disabled so that all of its outputs are low. That is, any one of the outputs of the load/shift logic circuit 155 will be high only to accomplish a data load into one of the shift registers (such as 161) associated with the four channels.

The QH' output of the shift register 161 is coupled to an inverter 163 which provides the signal transmit clock TCLK0, and also provides an input to an OR-gate 165. Another input to the OR-gate 165 is from the QA' output from the shift register 161. The output of the OR-gate 165 is coupled to corresponding OR-gates in the transmit timing circuits for the other three channels. The signal at the output of the OR-gate 165 is the transmit frame blank signal $\overline{FBLT}$ which is active (low) when a particular time slot or link bit (Table I) is for synchronous data. An inverter 168 generates FBLT, an inverted replica of $\overline{FBLT}$. The signal FBLT is applied to the shift register circuit 145 to prevent it from shifting when FBLT is high, indicating a synchronous data time slot.

The transmit timing circuits for channels 1 through 3 are structurally the same as the channel 0 transmit timing circuit 157. The latches in those circuits that correspond to the latch 159 will, of course, be respectively controlled by the outputs 155(1), 155(2), and 155(3) from the load/shift logic circuit 155. Accordingly, the signals ACTV1, ACTV2, ACTV3 will be generated.

The inputs common to all transmit timing circuits (as exemplified by channel 0 transmit timing circuit 157) include the output from the zero bit rate detector 153, the clock signal LTCK', and the timing data from the data latches 151. Each transmit timing circuit 157 also employs a common clear line for applying a clear signal $\overline{CLR}$ which will clear all the recirculating shift registers (such as 161) associated with the transmit timing circuits for all four channels.

Of course, the timing data from the data latches 151 are utilized by the individual transmit timing circuits only as controlled by the load/shift logic circuit 151.

The individual transmit timing circuits 157 for channels 1 through 3 provide TCLK1, TCLK2, TCLK3. Further, as discussed previously, the outputs of the OR-gates in the individual transmit timing circuits for channels 1 through 3 that correspond to the OR-gate 165 are coupled together with the output of the OR-gate 165 to provide the transmit frame blank signal $\overline{FBLT}$.

Associated with each of the transmit timing circuits (as exemplified by the channel 0 transmit timing circuit 157) is a transmit buffer circuit. Shown in FIG. 6 is a transmit buffer circuit for channel 0. The transmit buffer circuits for channels 1 through 3 will be identical in structure, but will of course have different inputs and outputs as explained herein.

The buffer circuit of FIG. 6 includes a counter 167 which can comprise an integrated circuit 4-bit binary counter such as a Type LS191. The counter 167 is configured as a down counter and is also configured to load a preset count when its load input control LD is low. As shown, the ACTV0 signal from the channel 0 transmit timing circuit 157 is applied to the LD input of the counter 167. The preset count can be in the middle of the count range of the counter 167, such as 1000 (decimal 8).

The counter 167 will remain at the preset count until ACTV0 goes high, indicating that channel 0 has become active. When the counter 167 is preset, the MAX/MIN output of the counter will go low, thus providing an enabling low signal to the enable input EN of the counter. When ACTV0 goes high (channel 0 active), the counter will increment on each clock provided by the signal SHIFT0. The signal SHIFT0 is provided by the channel 0 control/interface logic circuit 135. The counter 167 will then increment on each clock of SHIFT0 until the maximum count is reached, at which time the MAX/MIN output will go high, disabling the counter 167. The MAX/MIN output will then stay high.

The MAX/MIN output of the counter 167 is coupled to one input of an AND-gate 169. The other input to the AND-gate 169 is the channel 0 transmit clock TCLK0 generated by the channel 0 transmit timing circuit 157.

The output of the AND-gate 169 is coupled to the shift out control input SO of a first-in-first-out (FIFO) memory 171. The FIFO 171 can comprise a commercial integrated circuit such as the RCA CD40105B. Preferably, the FIFO is configured as a 16 by 1 FIFO and is thus capable of storing 16 bits.

The FIFO 171 is reset for accepting data in all its data registers when its input MR is high. The MR input is controlled by the signal $\overline{ACTV0}$ from the channel 0 transmit timing circuit 157. The signal $\overline{ACTV0}$ is high until channel 0 becomes active. Accordingly, the FIFO 171 starts storing data only when $\overline{ACTV0}$ goes low, indicating that channel 0 has become active. The shift-in clock input SI of the FIFO 171 receives the signal SHIFT0 from the channel 0 control/interface logic circuit 135 (FIG. 4). The channel 0 transmit data DIN0 (also from the channel 0 control/interface logic circuit 135) is applied to the data input D0 of the FIFO 171.

The counter 167 and the FIFO 171 cooperate to store a predetermined number of transmit data bits in the FIFO 171 after $\overline{ACTV0}$ goes low (and ACTV0 goes high). After the counter 167 reaches its maximum count, clock pulses derived from the signal TCLK0 will be applied to the shift out control input SO of the FIFO 171 via the AND-gate 169. The clock input to SO will cause the stored data to be outputted at the FIFO output QO.

The FIFO output QO is coupled to a NAND-gate 173 which is selectively enabled by a pair of flip-flops 175 and 177, each of which can be a Type LS74 device. The flip-flop 175 allows the NAND-gate 173 to be enabled on a positive transition of TCLK0, which is provided by the channel 0 transmit timing circuit 157. The flip-flop 177 disables the NAND-gate 173 on the subsequent positive transition of the clock LTCK'. That would allow the corresponding NAND-gates of the transmit buffers for channels 1 through 3 to become enabled when necessary.

It is important to note the TCLK0 through TCLK3 are derived from shift registers that are clocked by LTCK'. Accordingly, TCLK0, TCLK1, TCLK2, or TCLK3 will always be delayed from the TCLK' transition that caused the generation of TCLK0, TCLK1, TCLK2 or TCLK3. Thus, the flip-flops 175 and 177 will allow the NAND-gate 173 to be enabled for somewhat less than a full clock period of the signal LTCK'. That assures that there is no overlap in the times when the respective NAND-gates (such as 173) for the four channels are enabled.

The transmit buffer circuit of FIG. 6 includes the counter 167 and the FIFO 171 to compensate for possible variations between SHIFT0 and TCLK0. In theory, they should be reasonably well synchronized. However, if they are not, data could be lost. Accordingly, the FIFO 171 is only approximately half full before clock pulses are provided to the SO input of the FIFO 171. That would allow reasonable buffering if SHIFT0 is slightly faster or slower than LTCK'.

The output of the NAND-gate 173 is coupled to corresponding NAND-gates of the transmit buffers for channels 1 through 3 which are structurally identical to the channel 0 transmit buffer of FIG. 6. Of course, the inputs would be different. Thus, the transmit buffer for channel 1 would accept channel 1 data DIN1 and channel 1 shift clocks SHIFT1 from the channel 1 control-/interface logic circuit 137. It would also accept as inputs the signals ACTV1, $\overline{ACTV1}$, TCLK1 from the the transmit timing circuit associated with channel 1. Transmit buffers for channels 2 and 3 would accept as inputs corresponding signals associated with channels 2 and 3, respectively.

Each transmit buffer circuit has an output NAND-gate (such as NAND-gate 163), and the outputs of all four NAND-gates are coupled together and connected to the line 33 (FIG. 1) having the composite link transmit data LTD. Thus, it should be readily apparent that synchronous data is interleaved with frame data (containing data or control information) by the appropriate timing of when synchronous data and frame data is placed on the line 33.

In essence, the synchronous data and frame data are OR'd onto one line wherein only one data bit is allowed on the line at any given time. That timing is accomplished by allocation of bandwidth to synchronous channels in a non-conflicting manner. Bandwidth is allocated in the form of control frames which slave the synchronous port channels by virtue of the transmit timing circuits and transmit buffer circuits discussed above relative to FIGS. 5 and 6.

Figure 7:
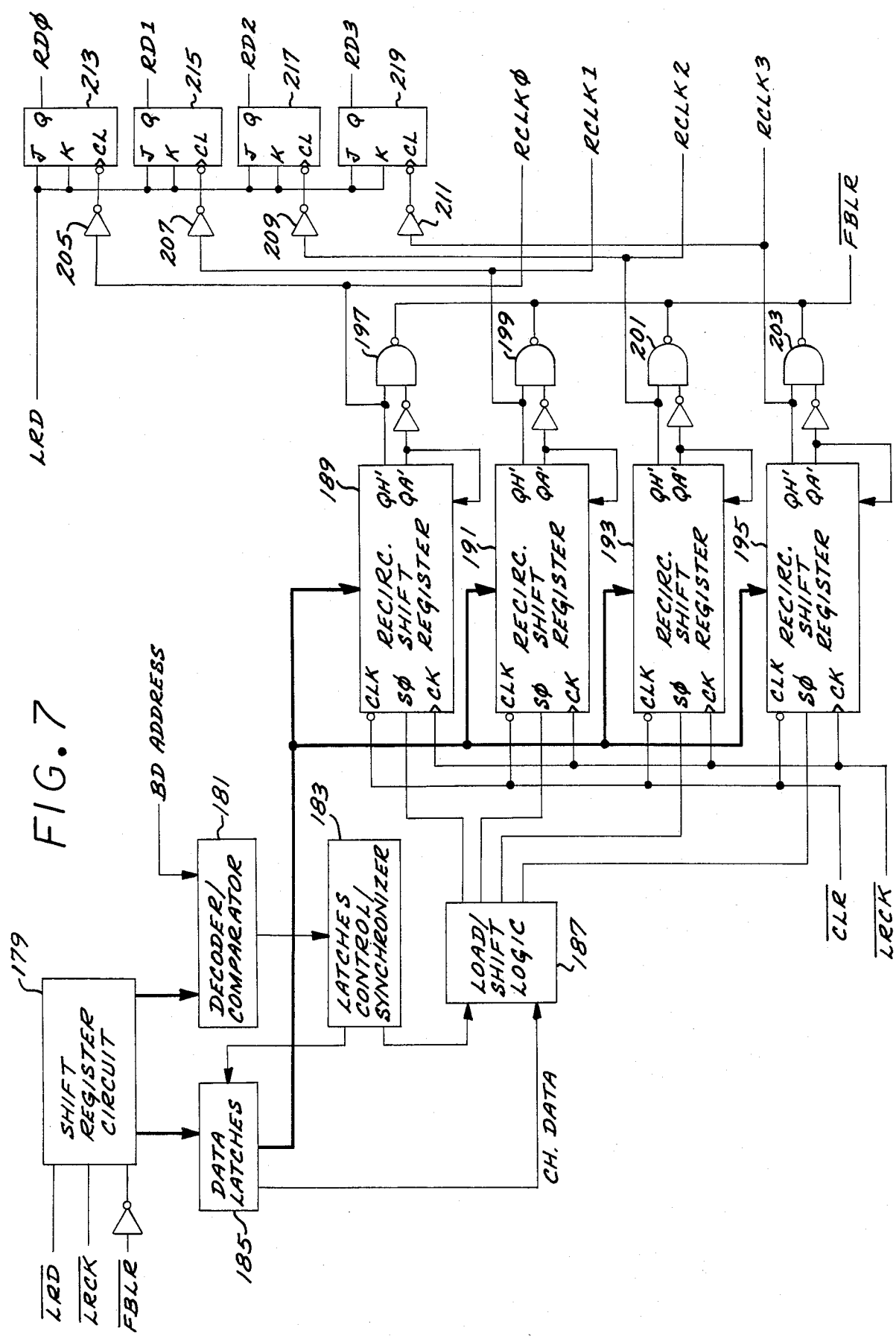
FIG. 7 is a schematic diagram of the receive frame decoder/timing circuit shown in FIG. 4.

Referring now to FIG. 7, shown therein is the receive frame decoder 133 (FIG. 4). The receive frame decoder is responsive to a predetermined control frame transmitted by a remote multiplexer. The remote multiplexer has a transmit decoder/timing circuit like the one described above relative to FIGS. 5 and 6 which corresponds in board address to a particular receive frame decoder. The receive frame decoder of FIG. 7 would respond to the same control frame responded to by its associated remote multiplexer transmit decoder/timing circuit.

The receive frame decoder shown in FIG. 7 would utilize the same timing data and channel data as its remote transmit decoder/timing circuit counterpart. That data is utilized to set up the timing to separate the synchronous channel data.

Particularly, a shift register circuit 179 is provided to selectively accept frame data from the buffered link receive data $\overline{LRD}$. The shift register circuit 179 is clocked by the buffered link receive clock $\overline{LRCK}$. Data from $\overline{LRD}$ is clocked into the shift register circuit 179 only when $\overline{FBLR}$ is low. When $\overline{FBLR}$ is high, the signal $\overline{LRD}$ contains synchronous data which should not be inputted to the shift register circuit 179. Accordingly, only frame data (containing asynchronous channel data or control information) is inputted to the shift register circuit 179. A decoder/comparator 181 is coupled to selected stages of the shift register 179 so that it can detect the occurrence of an appropriate control frame. The decoder/comparator 181 also accepts as an input the board address associated with the synchronous port interface 30 (FIG. 1). The decoder/comparator 181 also looks for board address information in certain stages of the shift register circuit 179.

When the decoder/comparator circuit 181 finds the predetermined control frame and board address information that matches the board address, a latches control/synchronizer circuit 183 is enabled. That circuit 183 enables a plurality of data latches 185 to accept timing data and channel information from the control frame stored in the shift register circuit 179.

As discussed relative to the transmit frame decoder/timing circuit, the channel data would typically comprise two bits which would be sufficient to identify each channel. That channel data is provided to a load/shift logic circuit 187 which operates in the same way as the load shift logic circuit 155 in FIG. 5.

The load/shift logic circuit 187 is also controlled by the latches control/synchronizer 183 to provide an output only a predetermined number of $\overline{LRCK}$ clocks after the control frame is detected. That synchronizing control is the same as the synchronizing control of the load/shift logic circuit 155 in FIG. 4. Accordingly, the receive frame decoder/timing circuit of FIG. 4 will be synchronized with its corresponding remote transmit frame decoder/timing circuit.

When the load/shift logic circuit 187 provides an output that is high, it enables the loading of the timing data from the data latches 185 into one of the shift registers 189, 191, 193 and 195. Each of the shift registers 189, 191, 193 and 195 respectively provides the individual channel receive clocks RCLK0, RCLK1, RCLK2, and RCLK3 which are coupled to the control/interface logic circuits 135, 137, 139 and 141, respectively. The QH' outputs from the shift registers 189, 191, 193, 195 are respectively inverted by inverters 205, 207, 209 and 211. Those inverters are coupled to the clock inputs of JK flip-flops 213, 215, 217, and 219. The J and K inputs of the JK flip-flops are commonly coupled to the buffered link receive data LRD.

The JK flip-flops are clocked by the QH' outputs of the shift registers 189, 191, 193 and 195. Thus, selected bits from the link receive data $\overline{LRD}$ are latched into the JK flip-flops 213, 215, 217, 219. Those data bits correspond to synchronous data that was interleaved into the link transmit data by a remote transmit frame decoder/timing circuit. The respective outputs from the JK flip-flops 213, 215, 217 and 219 are the individual receive data signals RD0, RD1, RD2 and RD3. The latched data signals RD0, RD1, RD2 and RD3 are provided to the channel control/interface logic circuits 135, 137, 139 and 141.

As discussed previously, the EIA control signals inputted to the synchronous port interface 30 are monitored for changes. Any change causes an interrupt of the CPU 45, which examines each of the four synchronous channels to determine further processing. Each EIA control signal change will cause a control frame to be assembled for transmission to a remote multiplexer.

If the EIA control signal change is to request bandwidth, and bandwidth was properly available, the control frame would include new timing data for setting up the corresponding transmit frame decoder/timing circuit and receive frame decoder/timing circuit.

If the EIA control signal change is to release bandwidth, the control frame would include timing data comprising all zeroes.

The foregoing control frames are respectively for allocation and de-allocation of bandwidth and would contain timing data different from that already associated with the particular channel to which the frames pertain. Such control frames would also include EIA control signal data for communicating changes in EIA control signals to a remote multiplexer. The transmit frame decoder/timing circuit 131 and the receive frame decoder 133 are not resopnsive to the EIA control signal.

The receive EIA control signal data is utilized by the CPU/control logic 20 for controlling one of the channel control/interface logic circuits 135, 137, 139 and 141 to change the appropriate EIA control signals provided to one of the DTE/DCE devices 41.

Where the EIA control signal change does not involve allocation or deallocation of bandwidth, then the control frame must include the same timing data which was used to set up the timing of the channel involved with the EIA control signal change. Such frames are utilized solely to communicate EIA control signal data.

It is evident that EIA control signal changes are transmitted by control frames assembled by the CPU/control logic 20 when changes occur in the EIA control signals from the DTE/DCE devices 41. It is also evident that EIA control signal data received by the multiplexer 10 is utilized by the CPU/control logic 20 to control the channel control interface logic circuits 135, 137, 139 and 141 to change the appropriate EIA control signals in response to the received EIA data. Further, each control frame is unique to a particular channel.

Figure 8:
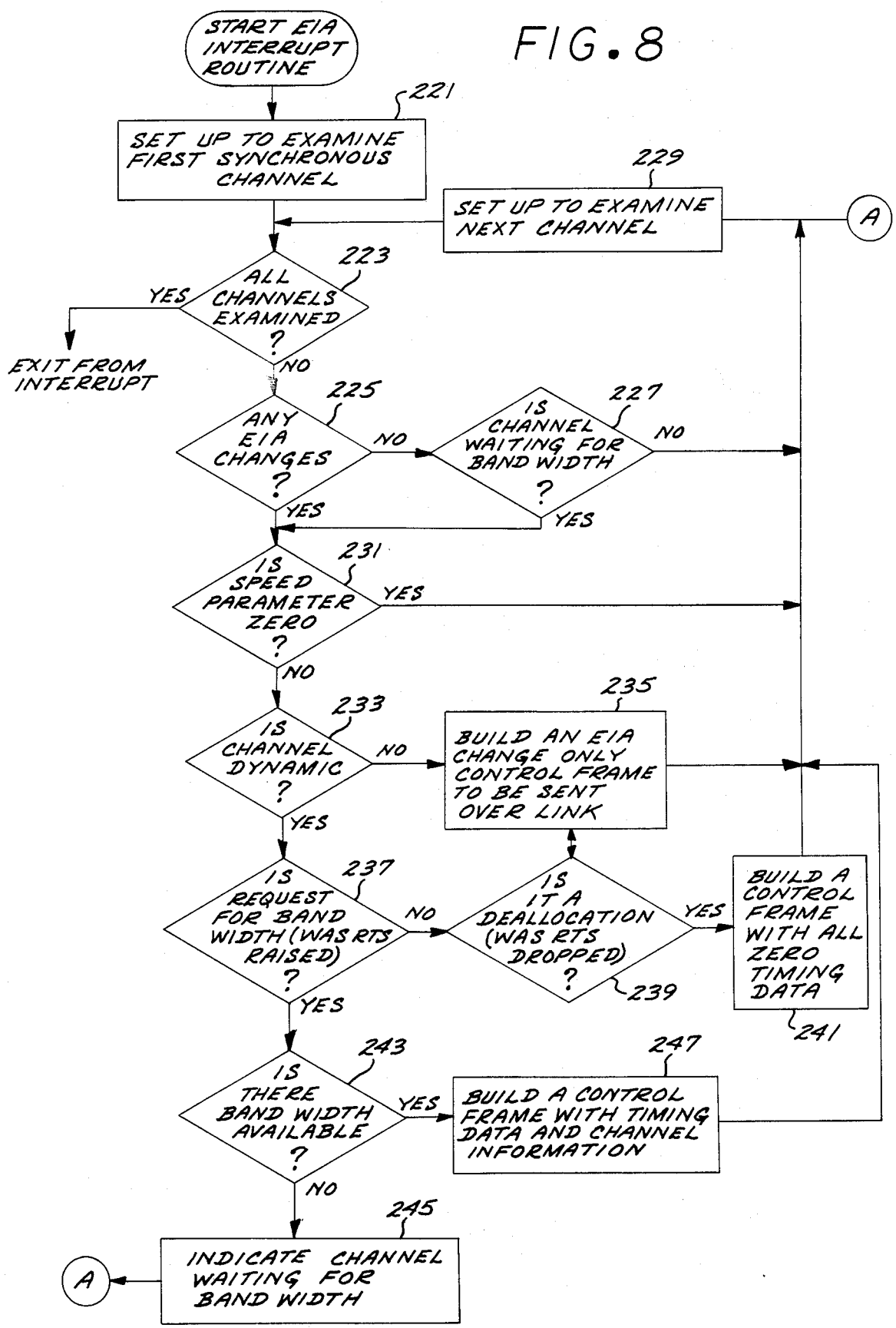
FIGS. 8 and 9 are flowcharts of the functions accomplished by the disclosed multiplexer relative to changes in EIA control signals of synchronous data devices utilizing the disclosed multiplexer.

Referring now to FIG. 8, shown therein is a flow chart of the procedure utilized by the CPU 45 (FIG. 2) in response to an EIA control signal change from one of the DTE/DCE devices 41 (FIG. 1). As discussed previously, the occurrence of such change is communicated via the interrupt signal $\overline{SINT}$ on the line 39.

After entry into the EIA interrupt routine, the procedure is set up to examine the first synchronous channel as shown by a function block 221. A decision block 223 identifies a decision as to whether all channels on the synchronous port interface 30 have been examined. If all have been examined then an exit from the interrupt is performed.

If not all channels have been examined, then a determination is made, as shown in a decision block 225, whether the channel being examined has had any changes of EIA control signals. If no changes have occurred, control branches to a determination whether the channel being examined is already waiting for bandwidth, as shown by a decision block 227. If the channel is not waiting for bandwidth, the procedure is set up to examine another channel that has not been previously examined, as shown by a function block 229.

If changes to EIA control signals did occur, then the channel speed parameter is checked in accordance with a decision block 231. If the channel speed parameter is zero, then control returns to the set-up procedure of the function block 229. The decision of block 231 is also made in response to an affirmative determination by the decision set forth in the block 221.

The speed parameter of a particular channel must be specified in the multiplexer so that it can determine how much bandwidth is required for each channel. By way of example, the speed parameter can be set by front panel controls. When the speed parameter for a channel is set to zero, that channel will not be given any bandwidth.

The next decision block 233 sets forth a determination of whether the channel being examined is given bandwidth on a dynamic basis.

It is contemplated that a given channel can be allocated dedicated bandwidth that cannot be allocated to any other channel. That would be similar to prior art time division multiplexers. When a given channel is dynamic, bandwidth is allocated to that channel only when it is requested.

If the channel being examined is not dynamic, then a control frame for providing only EIA control signal data is assembled, as shown in a function block 235. That control frame includes, of course, channel information and timing data, but the timing data must be the same as the timing data that allocated the present bandwidth of the channel. After the control frame with EIA control signal data is assembled, the interrupt routine sets up to examine the next channel in accordance with the function block 229.

If the channel being examined is dynamic, then a decision in accordance with a decision block 237 is made as to whether the EIA control signal change was to request bandwidth. That is, was RTS (request to send) raised? If it was not, then a determination is made in accordance with a decision block 239 as to whether the EIA control signal change was for deallocation of bandwidth. That is, was RTS dropped? If the determination is negative, then the routine proceeds in accordance with the function block 235 discussed above.

If RTS was dropped, then a control frame with all zero timing data is assembled as shown in a function block 241. That frame would also include EIA control signal data to indicate the change in RTS. Then, control is transferred to the function defined by the function block 229.

If the EIA control signal change was RTS being raised, then a decision block 243 provides for a determination of whether bandwidth is available. If it is not available, then that channel is identified as waiting for bandwidth. The interrupt routine then performs in accordance with the function block 229.

If bandwidth is available, then an appropriate control frame with timing data and channel information is assembled as shown by a function block 247. That control frame would also include EIA data such as the state of RTS. Then, control goes to the set-up function as defined by the function block 229.

If a channel is identified as a channel waiting for bandwidth, it keeps that status until bandwidth is allocated to it. Bandwidth cannot be allocated to a waiting channel until one of the other channels releases bandwidth.

Relative to the allocation or deallocation of bandwidth, the state of active channel signals ACTV0, ACTV1, ACTV2, and ACTV3 are utilized to raise or lower the EIA clear to send (CTS) signal for the appropriate channel.

Figure 9:
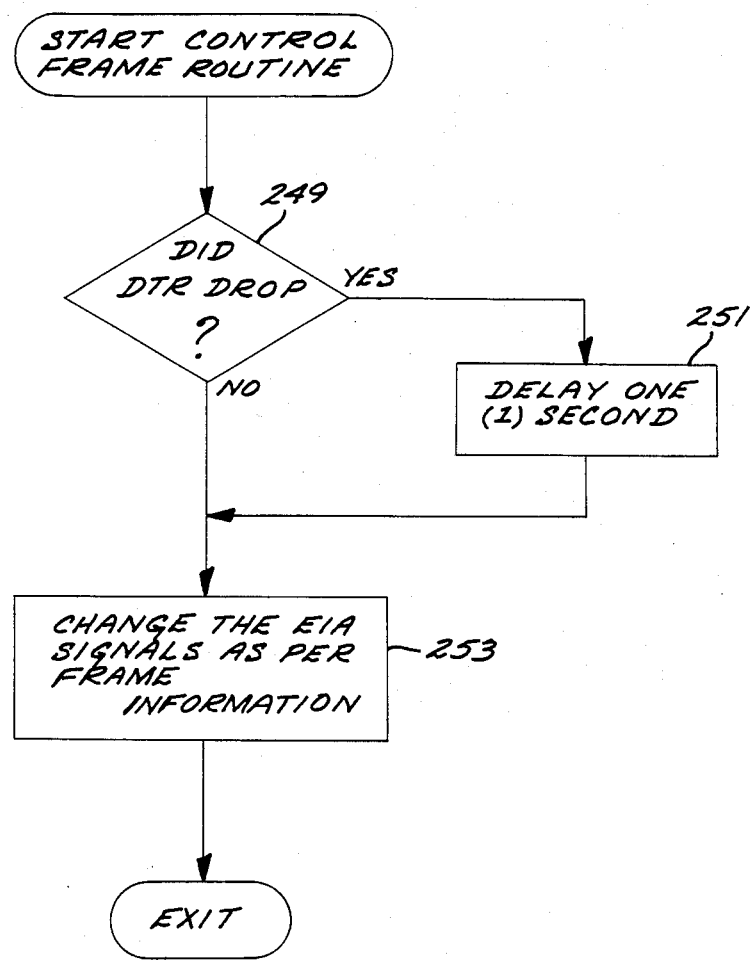

Shown in FIG. 9 is a flow diagram relative to the procedure followed by the CPU 45 when a control frame is received. A decision block 247 provides for a determination whether the EIA control signal data includes an indication that the EIA control signal data terminal ready (DTR) dropped. If DTR did drop, then a one second delay occurs, as shown by a function block 251.

With or without the delay of the function block 251, the appropriate EIA signals are changed in accordance with the EIA control signal data as shown by a function block 253. After those changes, the routine is exited.

With this detailed description of the structure and operation of the present invention it will be obvious to those skilled in the art that various modifications can be made without departing from the spirit and scope of the invention which is limited only by the following claims.

What is claimed is:

1. Multiplexer apparatus for use with a data link and having a means for interfacing with a plurality of asynchronous data devices, and a means for generating asynchronous data frames in response to data from the asynchronous data devices, said multiplexer apparatus comprising:

synchronous data port means for interfacing with a plurality of synchronous data equipment, said synchronous data port means providing bidirectional communication with said synchronous data equipment;

control means for allocating link bandwidth to any one of the synchronous data equipment in response to the need for any one of the synchronous data equipment to have bandwidth, and for deallocating bandwidth from any one of the synchronous data equipment when bandwidth is no longer required, said control means further generating control frames for transmission over the data link; and means for interleaving synchronous data bits from the synchronous data equipment having bandwidth with asynchronous data frames and with said control frames to form composite link data.

2. The multiplexer apparatus of claim 1 wherein said synchronous data port means comprises:

decoder means responsive to predetermined control frames generated by said control means; and timing means responsive to said decoder means for providing clock signals for synchronous data equipment having bandwidth.

3. The multiplexer apparatus of claim 2 wherein said decoder means includes:

transmit decoder means responsive to predetermined control frames for providing control signals to said timing means, said transmit decoder means further providing signals indicative of allocation or deallocation of bandwidth for the synchronous data equipment; and receive decoder means responsive to predetermined received control frames for providing control signals to said timing means.

4. The multiplexer apparatus of claim 3 wherein said timing means includes:

transmit timing means responsive to said transmit decoder means for providing transmit clock signals for the synchronous data equipment having bandwidth; and receive timing means responsive to said receive decoder means for providing receive clock signals for synchronous data equipment having bandwidth.

5. The multiplexer apparatus of claim 1 wherein said control means generates control frames that include timing information utilized by said synchronous data port means and control frames that include data indicative of communications control signals for the synchronous data equipment.

6. The multiplexer apparatus of claim 1 wherein said control means is responsive to received control frames that contain data indicative of communications control signal changes to alter associated communication control signals.

7. The multiplexer apparatus of claim 2 further including a transmit buffer circuit comprising:

memory means responsive to a first clock for storing transmit data, said memory means being further responsive to a second clock for outputting the stored data; and means for controlling said memory means to store a predetermined amount of transmit data before any transmit data is outputted.

8. The transmit buffer circuit of claim 7 wherein said memory means comprises a first-in first-out memory, and wherein said controlling means comprises a counter.

9. The multiplexer apparatus of claim 5 wherein said timing information includes a digital code indicative of a time slot allocation or deallocation.

10. The multiplexer apparatus of claim 5 wherein said timing information includes a digital code indicative of a time slot allocation or deallocation and wherein said communications control signals comprise data terminal interface control signals.

11. Multiplexer apparatus for asynchronous and synchronous data channels comprising:

means for producing a plurality of control signals;

control means responsive to selected said control signals for formatting said synchronous data into frames for transmission and for generating control frames for controlling synchronous transmission, a said control frame identifying a particular synchronous channel and the time slot allocation for said channel; and means responsive to said control frame for generating a signal indicating synchronous transmission is to proceed for a selected channel, and for inserting the synchronous data for said selected channel in the allocated time slot.

12. The multiplexer apparatus of claim 11 wherein said control means monitors the synchronous channels for channels requesting bandwidth and causes building of control frames for allocating synchronous transmission capacity to channels requesting bandwidth and control frames for deallocating synchronous transmission capacity to those channels no longer requiring it.

* * * * *